(12) United States Patent
Jellema et al.

(10) Patent No.: US 12,330,087 B2
(45) Date of Patent: Jun. 17, 2025

(54) MULTI STAGE SAFE DRY CONDENSING (71) Applicant: Solutherm B.V., Oss (NL)

(72) Inventors: Pieter Jellema, Oss (NL); Jelle Luutzen Nijdam, Oss (NL)

(73) Assignee: SOLUTHERM B.V., Oss (NL)

( * ) Notice: Subject to any disclaimer, the term of this patent is extended or adjusted under 35 U.S.C. 154(b) by 782 days.

(21) Appl. No.: 17/435,604

(22) PCT Filed: Mar. 6, 2020

(86) PCT No.: PCT/NL2020/050144
§ 371 (c)(1),
(2) Date: Sep. 1, 2021

(87) PCT Pub. No.: WO2020/185068
PCT Pub. Date: Sep. 17, 2020

(65) Prior Publication Data
US 2022/0152522 A1    May 19, 2022

(30) Foreign Application Priority Data
Mar. 8, 2019  (NL) ..................................... 2022700

(51) Int. Cl.
*B01D 11/04*        (2006.01)
*A23D 9/04*         (2006.01)
(Continued)

(52) U.S. Cl.
CPC ............ *B01D 11/0492* (2013.01); *A23D 9/04* (2013.01); *B01D 5/0036* (2013.01); *B01D 5/009* (2013.01);
(Continued)

(58) Field of Classification Search
CPC ... A23D 7/00; A23D 7/02; A23D 7/04; A23D 9/00; A23D 9/02; A23D 9/04; B01D 3/10;
(Continued)

(56) References Cited

U.S. PATENT DOCUMENTS 2,008,407 A * 7/1935 Stoever ................ F25B 29/003
165/146
4,134,740 A * 1/1979 Marion ...................... C10J 3/74
48/212

(Continued)

FOREIGN PATENT DOCUMENTS

CN     205031921 U  *  2/2016
CN     206408196 U     8/2017
(Continued)

OTHER PUBLICATIONS

Electrical Engineering; "Jet Condenser | Low Level High Level Ejector Jet Condenser"; Dec. 10, 2013; https://web.archive.org/web/20131210122547/https://www.electrical4u.com/jet-condenser-low-level-high-level-ejector-jet-condenser/ (Year: 2013).*

(Continued)

*Primary Examiner* — Drew E Becker
*Assistant Examiner* — Austin Parker Taylor
(74) *Attorney, Agent, or Firm* — Pillsbury Winthrop Shaw Pittman, LLP (57) ABSTRACT

A method and system for deodorizing an edible oil or fat. The method includes stripping substances from the oil or fat with a stripping medium at high temperature at a pressure of less than 5 mbar, and reducing volume and increasing pressure of the stripping medium in a multi-step process. In a first step the volume of the stripping medium is reduced by cooling it using a first heat transfer fluid loop at a first temperature, and the pressure is increased to a first inter- (Continued)

mediate pressure. In a second step the volume is reduced by cooling using a second heat transfer fluid loop at a second temperature, and it he pressure is increased to a second intermediate pressure. In a third step the volume is reduced by cooling using a third heat transfer fluid loop at a third temperature, and the pressure is increased to atmospheric pressure.

18 Claims, 3 Drawing Sheets

(51) Int. Cl.
  *B01D 5/00* (2006.01)
  *B01D 7/00* (2006.01)
  *C11B 3/14* (2006.01)
  *B01D 11/00* (2006.01)

(52) U.S. Cl.
  CPC ........... *B01D 7/00* (2013.01); *B01D 11/0488* (2013.01); *C11B 3/14* (2013.01); *B01D 2011/007* (2013.01)

(58) Field of Classification Search
  CPC ...... B01D 3/38; B01D 5/0003; B01D 5/0036; B01D 5/009; B01D 5/0093; B01D 7/00; B01D 7/02; B01D 11/04; B01D 11/0488; B01D 11/0492; B01D 2011/007; C11B 3/00; C11B 3/12; C11B 3/14; B67D 7/049; B67D 7/0494; F28B 1/00; F28B 1/06; F01K 9/00; F01P 2003/2214; F01P 2060/14; F25B 39/04; Y10S 165/184
  USPC ....................................................... 426/417
  See application file for complete search history.

(56) References Cited

U.S. PATENT DOCUMENTS

| | | | | |
|---|---|---|---|---|
| 4,838,997 A | * | 6/1989 | Merk | C11B 3/14 |
| | | | | 202/205 |
| 5,241,092 A | * | 8/1993 | Cheng | C11B 3/14 |
| | | | | 554/205 |
| 7,598,407 B2 | * | 10/2009 | Kruidenberg | C11B 3/14 |
| | | | | 554/22 |
| 9,567,549 B2 | * | 2/2017 | Gabor | C11B 3/14 |
| 2013/0180278 A1 | * | 7/2013 | Yamashita | F25B 7/00 |
| | | | | 62/335 |

FOREIGN PATENT DOCUMENTS

| | | | | | |
|---|---|---|---|---|---|
| EP | 1258524 A1 | | 11/2002 | | |
| EP | 2295734 A2 | * | 3/2011 | ............... | C11B 3/14 |
| GB | 701631 A | * | 12/1953 | | |
| GB | 2515720 A | * | 1/2015 | ............... | F25B 7/00 |
| WO | 02/32535 A1 | | 4/2002 | | |
| WO | 2015/119501 A1 | | 8/2015 | | |
| WO | WO-2018182037 A1 | * | 10/2018 | ............. | F24F 11/36 |

OTHER PUBLICATIONS

Nguyen, Oanh; "Carbon Dioxide as a Refrigerant"; RSI; Jul. 19, 2016; https://www.rsi.edu/blog/hvacr/carbon-dioxide-refrigerant/ (Year: 2016).*
W. De Greyt et al., "Deodorization", Bailey's Industrial Oil and Fat Products, Sixth Edition, Jan. 1, 2005, vol. 5 pp. 341-383 (Year: 2005).*
International Search Report mailed Apr. 20, 2020, issued in corresponding International Patent Application No. PCT/NL2020/050144 (3 pgs.)
W. De Greyt et al., "Deodorization", Bailey's Industrial Oil and Fat Products, Sixth Edition, Jan. 1, 2005, vol. 5 pp. 341-383.

* cited by examiner

MULTI STAGE SAFE DRY CONDENSING

CROSS-REFERENCE TO RELATED APPLICATIONS

This application claims priority to PCT/NL2020/050144, filed Mar. 6, 2020, which in turn claims priority to NL 2022700, filed Mar. 8, 2019, all contents of both of which are hereby incorporated by reference in their entireties.

FIELD OF THE INVENTION

The present invention relates to a method and system for physical refining and/or deodorization of edible oils and fats. More particularly the invention relates to a method for vacuum preservation for the physical refining and/or deodorization of edible oils and fats. More specifically, the invention relates to a method and a system for desubliming or condensing condensable fluids in a vapour mixture.

BACKGROUND TO THE INVENTION

In the production of edible oils and fats, produced for human consumption or as an ingredient in food products, it is important to produce such oils and fats having a bland taste, good keep ability, being free of malodorous compounds and without unhealthy by-products.

These quality parameters are, to a relatively large extent, determined by the last step of the oil refining process, viz. deodorization. Deodorization is a vacuum stripping process that removes the free fatty acids and malodorous compounds from the oil, as e.g. known from EP 1 258 524 A1. It is common to treat the oil in a deodorizer, and during the deodorization process subjecting the oil to temperatures of 200° C. or higher. This is done, for instance, by contacting the oil or fat to be deodorized, with an inert, gaseous stripping medium, usually steam, the so-called stripping steam. The stripping steam can be introduced at the bottom of a deodorizer vessel in which the oil or fat to be deodorized flows from top to bottom. Inside the deodorizer vessel, appropriate means induce a good contact between the oil or fat and the stripping steam. Consequently, the stripping steam vaporizes and dissolves fatty acids, colored and/or malodorous components and other volatile substances from the oil or fat. Accordingly, after deodorization, a stable, refined, colorless, tasteless and odorless oil is obtained. The stripping medium also has the function to agitate the oil and to create a large interfacial area between the liquid oil and the gaseous stripping medium, so that the unwanted volatile components evaporate from the oil to the stripping medium, at higher pressures than if no stripping medium was supplied to the oil bath.

The deodorization process requires reduced pressures preferably of less than 5 mbar. To be able to maintain such reduced pressures in the deodorizer vessel, the stripping medium with the impurities dissolved therein must be continuously evacuated from the deodorizer vessel by a vacuum preservation system. Usually, at least one scrubbing section is installed between the deodorizer and the vacuum preservation system, to separate entrained oil and/or free fatty acids or other valuable components such as tocopherol for example from the stripping medium. The main purpose of the vacuum preservation system is to collect the vapours from the deodorizer at sufficiently low pressure, to increase the pressure of the collected substances to near atmospherical value and to finally discharge the collected substances at the atmospherical pressure.

Increasingly severe demands for higher quality, healthier oils require lower deodorization temperatures in order to minimize the rate of thermal degradation of the oil during the deodorization process and to minimize rate of development of unwanted, unhealthy by-products. These lower temperatures, on the other hand, reduce the driving force for evaporation of the unwanted volatile compounds from the oil, which has to be compensated for by a reduction of the pressure inside the deodorizer.

The specific volume of the mixture of the stripping medium, non condensable gases and entrained fatty matters at the outlet of the deodorizer is typically 400 $m^3/kg$ at 4 mbar pressure and is inversely proportional to the absolute pressure at this point. For these pressures, volumetric displacement systems such as fans, compressors or steam ejectors were frequently applied as vacuum preservation systems. Nowadays, for 1 to 3 mbar pressure, the volume flow rate of the vapour mixture from the deodorizer is typically twice as high. The stripping medium, non condensable gases and entrained fatty matters can therefore no longer be pressurized from vacuum to ambient pressure by volumetric displacement systems in a technically and economically feasible way.

The applied stripping medium is usually steam. The gaseous mixture of stripping medium, non condensables and entrained fatty matters at the outlet of the deodorizer therefore for the major part is formed by condensable components. In order to reduce the volume flow rate to the vacuum preservation system, it is advantageous to condense the stripping medium containing the impurities dissolved therein, before increasing their pressure to atmospherical value. This is realized by supplying the evacuated stripping medium containing the impurities dissolved therein to a desublimation apparatus containing surfaces cooled with a heat transfer fluid, for instance liquid ammonia. The evacuated stripping medium containing the impurities dissolved therein desublimes or condenses on the cooled surfaces, so that a desublimate or condensate such as an ice layer, containing most of the impurities removed from the deodorized oil or fat is formed on the cooled surfaces. This process is sometimes designated as "dry condensing" or "ice condensing".

The specific volume reduction usually achieved by the condensation or desublimation of the condensable fraction is in the order of $10^5$ to $10^6$. The condensation or desublimation step is then followed by a compression step of the remaining non-condensable fraction.

Such a vacuum system is known from WO 2002/32535 and WO 2015/119501. The stripping medium, steam, non condensable gases and entrained fatty matters are supplied to a first holder in which tubes are present, which are internally cooled by a heat transfer fluid, usually liquid ammonia. The stripping medium supplied to the holder desublimes on the outer surfaces of the cooled tubes, as the tubes are cooled to temperatures well below the dew point temperature of the stripping medium and well below the freezing point of the water fraction, typically −25 to −35° C. for 1 to 3 mbar pressure inside this first holder. An ice layer is then formed on the outer surfaces of the tubes. This process of volume reduction by desublimation is usually designated by the name "dry condensing".

The first holder is provided with an outlet, which is connected to a first pressurizing system, comprising a set of two or three successive steam ejectors or dry vacuum pumps. This first pressurizing system discharges the mixture of not condensed gaseous components, from the pressure of the first holder of 1 to 3 mbar, to a higher pressure, usually in the range of 40 to 200 mbar. The dew point of the mixture after compression is higher than before the compression. Therefore, a new volume reduction step can be achieved in a second holder, at higher temperatures than in the first holder. The second holder, usually a shell and tube heat exchanger, plate heat exchanger, or (direct contact) spray condenser, is usually supplied with cooling water. A part of the condensable fraction of the not condensed gaseous components from the first holder condenses in the second holder.

The second holder is also provided with an outlet, which is connected to a second pressurizing system, comprising one or more steam ejectors or one or more vacuum pumps. This second pressurizing system discharges the mixture of not condensed gaseous components, from the pressure of the second holder of 40 to 200 mbar to atmospherical pressure, typically 900 to 1013 mbar.

It is also possible that the first pressurizing system discharges the mixture of not condensed gaseous components, from the pressure of the first holder of 1 to 3 mbar, directly to atmospherical pressure. In that case, the second holder for volume reduction and the second pressurizing system are omitted.

Figure 1:
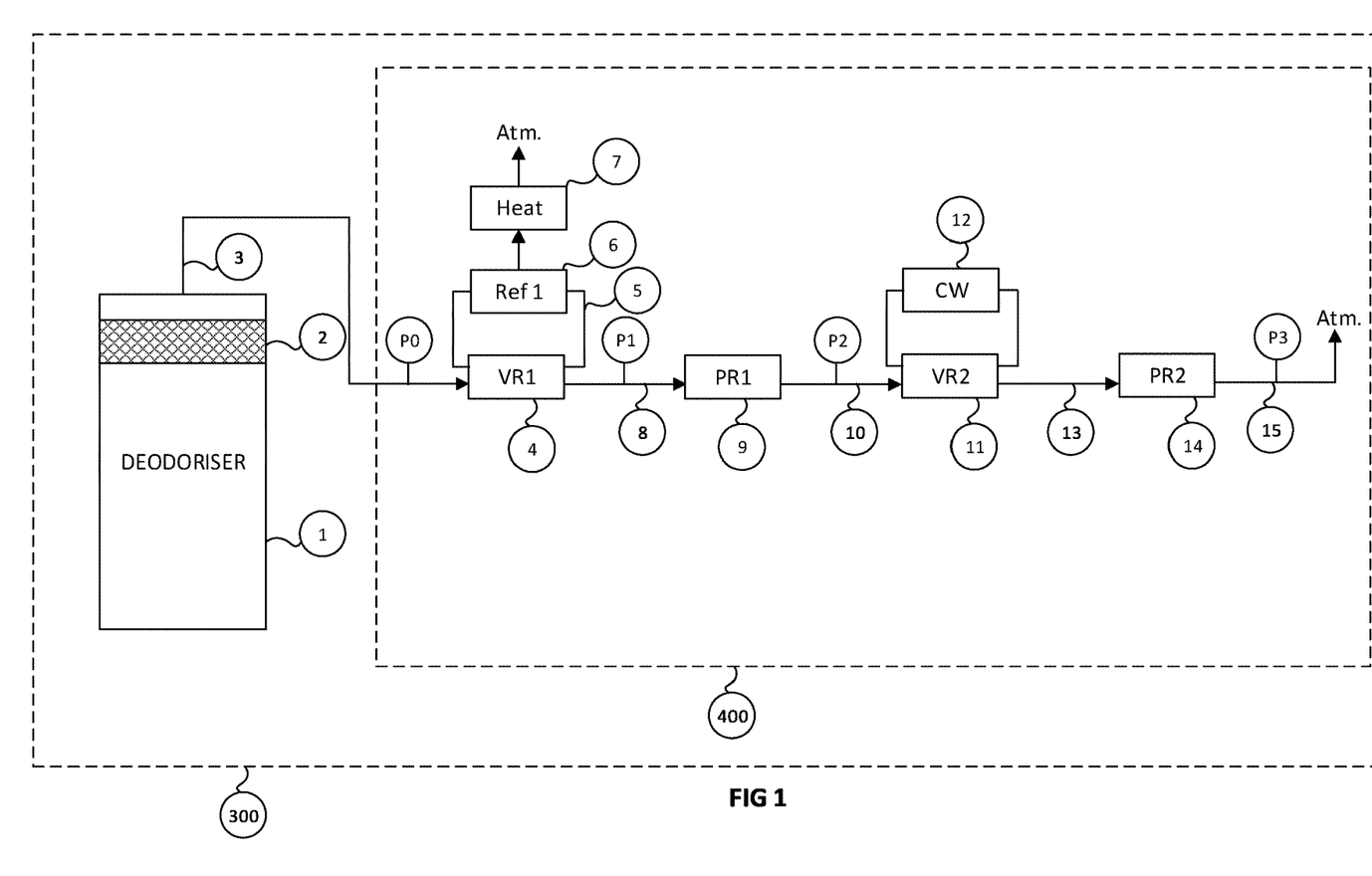
FIG. 1 is a schematic diagram of an example of a dry condensing system according to the present state of the art.

A schematic diagram of dry condensing vacuum system according to the present state of the art, with two volume reduction steps, VR1 and VR2 and two pressurizing steps, PR1 and PR2, is shown in FIG. 1 and is described in more detail below.

Figure 2:
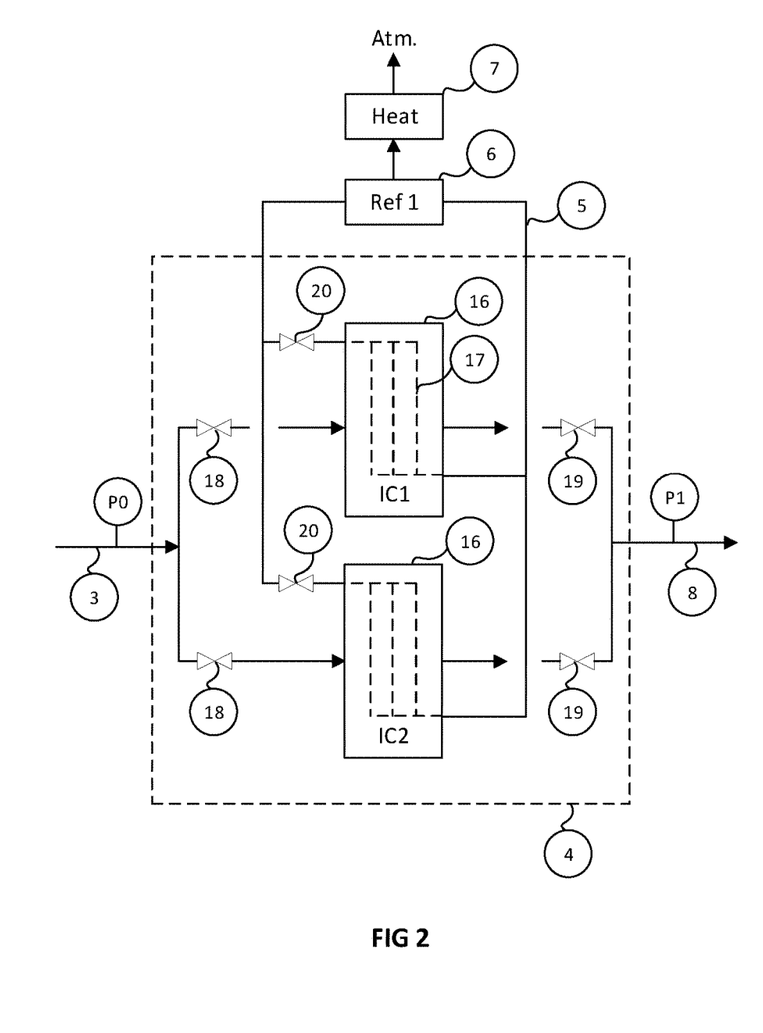
FIG. 2 is an example of the two condensers for the first volume reduction step of a dry condensing system.

The pressure P0, upstream of the first volume reduction step VR1, is typically in the range of 1 to 3 mbar. If steam is applied as stripping medium, then the condensation on the by a heat transfer fluid internally cooled tubes in VR1 takes place at dew point temperatures well below the freezing point of water (0° C.), usually −25° C. to −35° C. The stripping steam therefore desublimes on the tubes and forms an ice layer of continuously increasing thickness. The desublimation process is hampered to an increasingly extent for increasing thickness of the ice layer, because the ice layer acts as a thermal resistance for heat transport from the external condensation surface of the ice layer to the heat transfer fluid inside the tubes on the one hand and because on the other hand the ice layer reduces the free space between the tubes for admittance of the steam, non condensable gases and entrained fatty matters. The ice layer on the tubes must therefore from time to time be removed by a melting, or so-called de-icing process. Continuous, non interrupted operation of a deodorizer requires thus at least two holders for the first volume reduction step VR1, of which always at least one is available for desublimation as soon as another holder has to be de-iced, as is shown in FIG. 2

All available dry condensing (DC) systems make use of a refrigeration plant, to discharge the heat taken up by the heat transfer fluid from the desublimation process at the low temperature of −25 to −35° C. to a cooling water circuit at higher temperature (for example 20 to 40° C.) or directly to the atmosphere. DC systems generally use ammonia as a heat transfer fluid with phase change (refrigerant), because for commonly applied deodorization pressures of typically 1-3 mbar, ammonia has clear energetical advantages above other refrigerants.

New research has revealed the importance of an even further reduction of deodorization pressures, preferably down to 0.5 to 1 mbar, in order to allow for a further reduction of oil temperatures to avoid the development of unhealthy substances such as glycidyl esters.

These extreme low pressures are attainable with dry condensing systems, on the condition that the temperature of the surfaces on which the stripping medium and impurities dissolved therein condense is low enough, well below the accordingly also reduced dew point of the stripping medium from the deodorizer, in case of steam typically −35 to −45° C. Such low temperatures can not easily be generated when ammonia is applied as heat transfer fluid in the refrigeration system. The energy consumption of a refrigeration plant with ammonia temperatures ranging from −35° C. to −45° C. would namely be substantially, over 50%, higher than for the so far applied 10 degrees higher ammonia temperatures. In addition, the capacity of the refrigeration compressor drops by at least 50%. This has to be compensated for by applying a compressor with larger volumetric suction capacity.

Moreover, in some areas, like for example seismic or with population nearby, ammonia is not preferred, or even not permitted, for safety reasons. Ammonia can be explosive within a certain concentration range and can be dangerous for human beings, when being exposed to certain high concentration levels.

Another, safe, heat transfer fluid other than ammonia should for these applications preferably be applied. This heat transfer fluid should also be applicable for the lower (−35 to −45° C.) temperature demands, still in a technically and economically feasible manner.

Providing a method and system enabling a dry condensing system to apply a safer heat transfer fluid than ammonia, which despite the increasingly severe demands for healthier oils, lower pressures and lower temperatures still provides a technical and economical feasible solution for vacuum preservation would thus provide great benefits.

SUMMARY OF THE INVENTION

There is a demand for an improved method and system for deodorizing an edible oil or fat. Alternatively, or additionally, there is a demand for a dry condensing method and system, such as for use in such deodorizing, which is applicable in a technical and economical fashion for vacuum preservation at extreme low pressures, of typically 0.5 to 1 mbar. There is also a demand for a dry condensing method and system, such as for use in such deodorizing, which uses a heat transfer fluid which is safer than ammonia and with low environmental impact in terms of global warming potential, GWP, and ozone depletion potential, ODP.

According to an aspect is provided a method for deodorizing an edible oil or fat. The method includes stripping, e.g. removing volatile substances from the oil or fat with a stripping medium, at oil temperatures, such as 160° C. or more, such as about 200-260° C., e.g. about 250° C. or even at multiple successive oil temperatures within the mentioned range, at a pressure of less than 5 mbar, preferably less than 2 mbar, more preferably less than 1 mbar. The method includes reducing volume and increasing pressure of the stripping medium in a multi-step, e.g. dry condensing, process. The multi-step process includes, in a first step, reducing the volume of the stripping medium by at a first intermediate pressure, by desubliming or condensing the stripping medium on cold surfaces internally cooled by a first heat transfer fluid loop, followed by a first pressure increase step. The multi-step method includes, in a second step, reducing the volume of the not condensed gases emitted from the first step by desubliming or condensing on surfaces cooled by a second heat transfer fluid loop, followed by a second pressure increase step. The multi-step process includes, in a third step, decreasing the volume of the not condensed gases emitted from the second step by desubliming or condensing on cold surfaces cooled by a third heat transfer fluid loop, followed by increasing the pressure to atmospherical pressure. The cooling in the second and/or third step can be indirect cooling, such as via a heat exchanger surface, or direct cooling, whereby the condensate and heat transfer fluid are in direct contact (e.g. spray condenser).

It has surprisingly been observed that when providing at least three subsequent steps of respectively reducing volume and increasing the pressure of the stripping medium allows for unexpected benefits.

Optionally, the first heat transfer fluid loop is separate from the second heat transfer fluid loop. Optionally, the first heat transfer fluid loop includes a different heat transfer fluid from the second heat transfer fluid loop, and/or the second heat transfer fluid loop includes a different heat transfer fluid from the third heat transfer fluid loop. Each refrigerant can then be optimally selected for the prevailing temperatures, pressures, energy efficiency, with or without phase change and safety requirements. For instance, this allows for the application of three different heat transfer fluids, each with different characteristics, each of which therefore can be used optimally, in their optimal temperature/pressure range. Moreover, it has surprisingly been observed that the seemingly added complexity of using three different heat transfer fluids instead of two (ammonia and water) in practice leads to a, e.g. dry condensing, method that is unexpectedly energy efficient, even at very low temperatures and can be realised against unexpectedly low costs. In addition, the three different heat transfer fluids, each in a different temperature range, allow to apply safe heat transfer fluids, such as carbon dioxide, in a technically and economically feasible way, avoiding high pressures or transcritical operations. This was earlier, using the present state of the art, not possible. Applying carbon dioxide instead of ammonia in present state of the art DC systems would namely require much higher design pressures (>70 bar) of the system components than for ammonia (17 to 23 bar) and a transcritical refrigeration system with much lower energy efficiency than currently is achieved for system with ammonia.

Optionally, each subsequent heat transfer fluid loop takes up the heat from the preceding heat transfer fluid loop. Optionally, heat from the first heat transfer fluid loop is transported to the second heat transfer fluid loop via an intermediate circuit. The intermediate circuit can include a non-evaporating heat transfer fluid, or heat transfer fluid with phase change.

According to an aspect is provided a multi-stage dry condensing system, with multiple, at least three, different heat transfer fluids and multiple, at least three, condensation pressures, which meets the growing demands to lower vacuum pressures, safer refrigerants, high energy efficiency and against affordable investment costs.

Prior art dry condensing systems always consist of either one or two successive volume reduction and pressurisations steps, containing one partially evaporating heat transfer fluid for the first volume reduction step, usually ammonia.

For reduction of deodorization pressures, preferably down to 0.5 to 1 mbar, in order to allow for a further reduction of oil temperatures to avoid the development of unhealthy substances such as glycidyl esters, temperatures of the condensing surfaces inside dry condensers are to be kept well below the dew point of the stripping medium from the deodorizer, hence for steam typically −35 to −45° C. Such low temperatures can not easily be generated when ammonia is applied as the heat transfer fluid in the refrigeration loop.

The energy consumption of a refrigeration plant with ammonia temperatures ranging from −35° C. to −45° C. would be substantially, over 50%, higher than for the so far usual 10 degrees higher ammonia temperatures. In addition, the capacity of the refrigeration compressor drops by at least 50%. This has to be compensated for by applying a compressor with larger volumetric suction capacity. Another refrigerant should preferably be applied, with better performance characteristics at such extreme low temperatures. Moreover, in some areas, like for example seismic or with population nearby, ammonia is not preferred, or even not permitted, for safety reasons. Ammonia can be explosive within a certain concentration range and can be dangerous for human beings, when being exposed to certain high concentration levels. Providing a method and system using another refrigerant than ammonia would provide great benefits.

Optionally, the first heat transfer fluid loop includes carbon dioxide, $CO_2$. Optionally, the $CO_2$ in the first heat transfer fluid loop is always maintained at a sufficiently low temperature to guarantee sub-critical condensation of the $CO_2$, e.g. due to sufficiently low temperatures of the second heat transfer fluid loop. Hence, a relatively complex transcritical process of the carbon dioxide can be avoided.

Optionally, a portion of the stripping medium bypasses the first step.

Optionally, an odorous compound, such as Mercaptan, is added to the first carbon dioxide loop so that humans can smell leakages in the process area in an early stage, well before carbon dioxide concentrations become harmful.

According to an aspect is provided a deodorizing system for deodorizing an edible oil or fat. The deodorizing system includes a deodorizer arranged for stripping, e.g. volatile, substances from the oil or fat with a stripping medium, at oil temperatures, such as 160° C. or more, such as about 200-260° C., e.g. about 250° C. or even at multiple successive oil temperatures within the mentioned range, at a pressure of less than 5 mbar, preferably less than 2 mbar, more preferably less than 1 mbar. The deodorizing system includes a dry condensing system. The dry condensing system includes a first volume reduction unit including a first heat transfer fluid loop for desubliming or condensing the stripping medium at a first temperature, and a first pressurizing system arranged for increasing the pressure to a first intermediate pressure. The dry condensing system includes a second volume reduction unit including a second heat transfer fluid loop for desubliming or condensing the stripping medium at a second temperature, and a second pressurizing system arranged for increasing the pressure to a second intermediate pressure. The dry condensing system includes a third volume reduction unit including a third heat transfer fluid loop for desubliming or condensing the stripping medium at a third temperature, and a third pressurizing system arranged for increasing the pressure to atmospheric pressure.

Optionally, the first heat transfer fluid loop is separate from the second heat transfer fluid loop.

Optionally, each subsequent heat transfer fluid loop is arranged to take up the heat from the preceding heat transfer fluid loop. Optionally, heat from the first heat transfer fluid loop is transported to the second heat transfer fluid loop via an intermediate circuit, e.g. including a non-evaporating recirculating heat transfer fluid, or a heat transfer fluid with a phase change.

Optionally, the first heat transfer fluid loop includes a different heat transfer fluid than the second heat transfer fluid loop, and/or the second heat transfer fluid loop includes a different heat transfer fluid than the third heat transfer fluid loop.

Optionally, the first heat transfer fluid loop includes $CO_2$. Optionally, the $CO_2$ in the first heat transfer fluid loop is always maintained subcritical.

Optionally, the deodorizing system includes a bypass for allowing a portion of the stripping medium to bypass the first volume reduction unit.

Optionally, an odorous compound, such as Mercaptan, is be added to the first heat transfer fluid loop.

According to an aspect is provided a dry condensing system including a first volume reduction unit including a first heat transfer fluid loop for desubliming or condensing the stripping medium at a first temperature, and a first pressurizing system arranged for increasing the pressure to a first intermediate pressure; a second volume reduction unit including a second heat transfer fluid loop for desubliming or condensing the stripping medium at a second temperature, and a second pressurizing system arranged for increasing the pressure to a second intermediate pressure; and a third volume reduction unit including a third heat transfer fluid loop for desubliming or condensing the stripping medium at a third temperature, and a third pressurizing system arranged for increasing the pressure to atmospheric pressure.

It will be appreciated that all features and options mentioned in view of the method apply equally to the deodorizing system and the dry condensing system and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

FIG. 1 shows a schematic diagram of an example of deodorizing system 300 including a dry condensing vacuum system 400 according to the present state of the art, with two volume reduction steps, VR1 and VR2 and two pressurizing steps, PR1 and PR2.

An oil to be deodorized is provided in the deodorizer. The stripping medium, non condensable gases and entrained components from the oil bath are transported through the deodorizer 1, via a scrubber 2 and connection pipe 3 and are supplied to the holder 4 of a first volume reduction step, VR1, at a pressure P0. The tubes inside VR1 are internally cooled by a heat transfer fluid, recirculating via a heat transfer fluid loop 5 and partially evaporating inside the tubes inside VR1. The heat transfer fluid is cooled and liquefied to the correct temperature again by a refrigeration system Ref1 6, from which heat is released to the atmosphere via a water cooled condenser, cooling tower or evaporative condenser 7.

Not condensed vapours and non-condensable gases are discharged from VR1 at a pressure P1 and are transported via a pipe 8 to a first pressurizing system, PR1 9, for example comprising a dry vacuum pump or a set of steam ejectors. The pressure after PR1, P2, can be atmospheric. In that case, the gaseous components can be released from PR1 to the atmosphere. Usually, the pressure P2 is sub-atmospherical, in the range of 40 to 200 mbar. In that case, the gaseous components are supplied from PR1 via a connection pipe 10 to a second volume reduction step, VR2 11, wherein P2 is usually high enough to establish a substantial volume reduction by the condensation on surfaces cooled by a heat transfer fluid, usually recirculating cooling water, CW 12, or by direct contact of the gaseous components with the cooling water. The remaining not condensed vapours and residual air are discharged from VR2 via a connection pipe 13 to a second pressurizing system, PR2 14, usually a watering vacuum pump, which finally increases the pressure of these residual gaseous components to atmospherical value, P3, whereby these gases can be released via a discharge pipe 15.

It will be appreciated that in case of only one compression step, the items 11 to 15 are not present.

The pressure P0, upstream of the first volume reduction step VR1, is usually in the range of 1 to 3 mbar. If steam is applied as stripping medium, then the condensation on the tubes in VR1 takes place at temperatures well below 0° C., usually −25° C. to −35° C. The stripping steam therefore desublimes on the tubes and forms an ice layer of continuously increasing thickness. The desublimation process is hampered to an increasingly extent for increasing thickness of the ice layer, because the ice layer acts as a thermal resistance for heat transport from the external condensation surface of the ice layer to the heat transfer fluid inside the tubes on the one hand and because on the other hand the ice layer reduces the free space between the tubes for admittance of the steam, non condensable gases and entrained fatty matters. The ice layer on the tubes therefore must from time to time be removed, by a melting process. Continuous, non interrupted operation of a deodorizer requires thus at least two holders for the first volume reduction step VR1, of which always at least one is available for desublimation as soon as another holder has to be de-iced. This is shown in FIG. 2, where VR1 4 includes two holders 16. It will be appreciated that it is also possible that VR1 includes more than two holders 16.

FIG. 2 shows an example of a dry condensing system, VR1, with two holders 16 with internally cooled tubes 17. Each holder, usually denoted as ice condenser, is equipped with an inlet valve 18 in the supply pipe for admitting the vapours from the deodorizer at a pressure P0, an outlet valve 19 in the outlet pipe, for the discharge of not condensed gases at a pressure P1 to the connection pipe 8 to PR1.

The pressure P1 is usually 0.1 to 0.5 mbar lower than the pressure P0, amongst others due to pressure losses across the inlet valve 18, ice condenser 16 and outlet valve 19.

All presently available dry condensing (DC) systems make use of a refrigeration plant Ref1 6 for taking up heat from the desublimation process inside 16 at a low temperature of −25 to −35° C. and the discharge of heat 7 at higher temperature (20-40° C.) to the atmosphere or a cooling water circuit. DC systems generally use ammonia as a heat transfer fluid, with phase change, because for commonly applied deodorization pressures of typically 1-3 mbar, ammonia has clear energetical advantages above other heat transfer fluids.

With respect to the present invention, it is noted that new research has revealed the importance of an even further reduction of deodorization pressures, preferably down to 0.5 to 1 mbar, in order to allow for a further reduction of oil temperatures to avoid the development of unhealthy substances such as glycidyl esters.

These extreme low pressures are attainable with dry condensing systems, if the temperatures of the condensing surfaces 17 inside the ice condensers 16 are low enough, well below the dew point of the stripping medium (mostly steam) from the deodorizer, hence typically −35 to −45° C.

Such low temperatures can not easily be generated when ammonia is applied as the heat transfer fluid in the recirculation system 5. The energy consumption of a refrigeration plant Ref1 with ammonia temperatures ranging from −35° C. to −45° C. would namely be substantially, over 50%, higher than for the so far usual ten degrees higher ammonia temperatures, while in addition, the capacity of the refrigeration compressor drops by at least 50%. This has to be compensated for by applying a refrigeration compressor with larger volumetric suction capacity. Another heat transfer fluid should preferably be applied, with better performance characteristics at the extreme low temperatures.

In some areas, like for example seismic or with population nearby, ammonia is not preferred, or even not permitted, for safety reasons. Ammonia can namely be explosive within a certain concentration range and can be dangerous for human beings, when being exposed to certain high concentration levels. Another heat transfer fluid than ammonia should be found for these applications too.

The selection of heat transfer fluids is not only based on low temperature performance characteristics or safety aspects. Globally increasing environmental awareness requires or even permits the application of heat transfer fluids with limited GWP values (Global Warming Potential) and forbids the use of heat transfer fluids with high ODP values (Ozone Depletion Values).

These technical, safety and environmental criteria drastically narrow the selection of possible and suitable heat transfer fluids for dry condensing systems.

If, for example, carbon dioxide would be applied as a heat transfer fluid (safe, GWP=1, ODP=0) instead of ammonia in present state of the art DC systems, then this would require a drastical modification of the equipment, certified for design pressures over 70 bar, while currently being certified for 17 to 23 bar (for ammonia). With carbon dioxide in the present equipment, a transcritical refrigeration process would be established with much lower energy efficiency than currently is achieved for systems with ammonia. Carbon dioxide, or other heat transfer fluids, can therefore not simply replace ammonia in present systems, without drastically modifying the equipment design, accepting increasing investment costs of the equipment and accepting a substantial increase of energy consumption figures.

Figure 3:
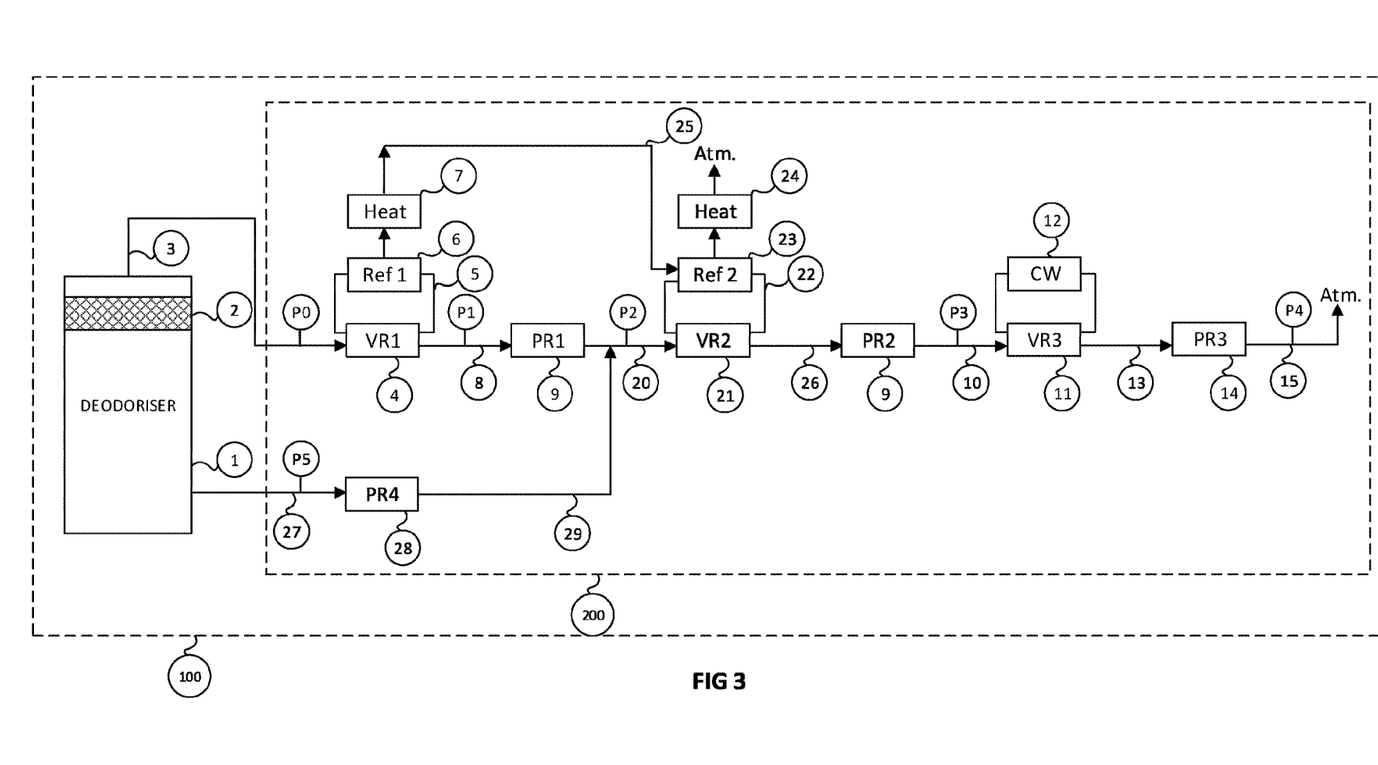
FIG. 3 is a schematic diagram of an example of multi stage safe dry condensing system.

FIG. 3 shows a schematic diagram of an example of a deodorizing system 100, including a multi stage dry condensing system 200. An oil to be deodorized is provided in the deodorizer. The stripping medium, non condensable gases and entrained components from the oil bath are transported through the deodorizer 1, via a scrubber 2 and connection pipe 3 and are supplied to the holder 4 of the first volume reduction step, VR1, at a first pressure P0, which can be in the range of 0.5 to 1 mbar, but can also be even lower or higher.

The cooling surfaces, in this example tubes, inside VR1 are internally cooled by a first, partially evaporating, heat transfer fluid from a first refrigeration system, Ref1, recirculating via a heat transfer fluid loop 5 and partially evaporating inside the tubes inside VR1. The evaporated heat transfer fluid is cooled to the correct temperature and liquefied again by the first refrigeration system Ref1 6, from which heat is released to a second refrigeration system, Ref2 23, directly or via a closed loop transport circuit 25 (for example using glycol, or a closed thermosiphon system).

The temperature of the first heat transfer fluid of the first refrigerant loop 5 is mainly determined by the pressure, P0, in the outlet of the deodorizer and will be typically in the range of −35 to −45° C. A suitable heat transfer fluid for this application could for example be $CO_2$.

Not condensed vapours and non-condensable gases are discharged from VR1 at a pressure P1 and are transported via a pipe 8 to a first pressurizing system, PR1 9, for example a dry vacuum pump or one or more successive steam ejectors. The first intermediate pressure after PR1, P2, is subatmospherical, for example in the range of 4 to 20 mbar. The gaseous components are supplied from PR1 via a connection pipe 20 to a second volume reduction step, VR2 21. The cooling surfaces, here tubes or plates, inside VR2 are internally cooled by a second heat transfer fluid, recirculating via a second heat transfer fluid loop 22 and partially evaporating inside the tubes or plates inside VR2. The second heat transfer fluid loop 22 not only takes up heat from VR2, but also from Ref1. The heat transfer fluid Ref2 is cooled to the correct temperature and liquefied again by a second refrigeration system Ref2 23, from which heat is released to the atmosphere, e.g. via a water cooled condenser, cooling tower or evaporative condenser 24.

Not condensed vapours and non-condensable gases are discharged from VR2, still at the first intermediate pressure P2 and are transported via a pipe 26 to a second pressurizing system, PR2 9, compressing the vapours to a second intermediate pressure P3. The second intermediate pressure P3 is usually high enough to establish a substantial volume reduction by the condensation on surfaces cooled by recirculating cooling water, CW 12, or by direct contact between the vapours and the cooling water. The remaining not condensed vapours and residual air are discharged from VR3 via a connection pipe 13 to a third pressurizing system, PR3 14, usually a watering vacuum pump, which finally increases the pressure of these residual gaseous components to atmospherical value, P4, whereby these gases can be released via a discharge pipe 15.

The temperature of the second heat transfer fluid of the second heat transfer fluid loop 22 is mainly determined by the first intermediate pressure, P2, in the outlet of the preceding compression step and can be typically in the range of −5 to +5° C., for example 0° C. This temperature determines the condensation temperature of the first heat transfer fluid. A 0° C. evaporation temperature of the second heat transfer fluid would enable the condensation of the first refrigerant close to 0° C. If $CO_2$ is applied as the first heat transfer fluid, then the condensation temperature of the $CO_2$ would be sub critical, which simplifies the set-up of the first refrigeration system, Ref1. Many safe and energy friendly options are available for the selection of the second refrigerant, with about 0° C. evaporation temperature and close to atmospherical condensation temperature. The second refrigeration system, Ref2, can even be a kind of standard available ice water chiller.

Optionally, the deodorizer can be provided with a second vapour outlet 27, with a higher pressure P5 than pressure P0, which is connected to the pipe 20 from PR1 to VR2, with pressure P2, via a transport pipe 29. Optionally, a pressurizing system PR4 28 can be incorporated in this transport pipe 29 in case the pressure P5 would not exceed pressure P2.

The pressure P0, upstream of the first volume reduction step VR1, can be as low as 0.5 to 1 mbar. If steam is applied as stripping medium, then the condensation on the tubes in VR1 takes place at temperatures well below 0° C., usually −35° C. to −45° C. The stripping steam therefore desublimes on the tubes 16 and forms an ice layer of continuously increasing thickness. The desublimation process is hampered to an increasing extent for increasing thickness of the ice layer, because the ice layer acts as a thermal resistance for heat transport from the external condensation surface of the ice layer to the heat transfer fluid inside the tubes on the one hand and because on the other hand the ice layer reduces the free space between the tubes for admittance of the steam, non-condensable gases and entrained fatty matters. The ice layer on the tubes must therefore from time to time be removed, by a melting or so-called de-icing process. Continuous, non interrupted operation of a deodorizer requires thus at least two holders for the first volume reduction step VR1, of which always at least one is available for desublimation as soon as another holder has to be de-iced. This is shown in FIG. 2, where VR1 includes of two holders, 16. It is also possible that VR1 includes more than two holders 16.

FIG. 3 shows a possible configuration including three sets of volume reduction and pressurization steps. Note that according to an aspect, a fourth or even more sets of these sets may be added.

Furthermore, according to the invention, at least three volume reduction steps are incorporated, the first at pressure P1, the second at pressure P2 and the third at pressure P3.

Desublimation at pressure P1 occurs inside the at least one ice condenser 4, by the indirect condensation against a first heat transfer fluid 5, of the first refrigeration system, Ref1. The first refrigeration system Ref 1 can contain for example carbon dioxide as heat transfer fluid, evaporating at for example −35 to −45° C. and condensing at subcritical temperature of for example 0° C., indirectly against the second heat transfer fluid or against a closed loop transport system 25 of for example a glycol based recirculation system.

The not condensed vapour and non condensable gases from VR1 partially condense in VR2 at pressure P2, which is for example in the range of 4 to 20 mbar, with condensing temperatures in the range of −5° C. to +5° C., for example close to 0° C., which are preserved by means of the second heat transfer fluid of the second refrigeration system Ref2. This second refrigeration system not only takes up the heat from VR2, but also from Ref1, via the transport circuit 25.

If, according to an aspect, a second discharge pipe from the deodorizer is connected to the inlet of VR2 (thus a portion of the stripping medium bypassing the first volume reduction step VR1), then VR2 not only condenses vapours from VR1 but also vapours directly from the deodorizer, discharged at pressure P5.

In case pressure P5 is lower than pressure P2, then a pressure increase step PR4 28 might be incorporated in the second discharge pipe 27 from the deodorizer. If PR4 includes one or more steam ejectors, then the motive steam from these ejector(s) can also be supplied to VR2 at pressure P2.

Note that, according to an aspect, also more than two refrigeration systems might be installed, wherein each refrigeration system takes up heat from the preceding system, wherein the first refrigeration system, Ref1, contains a heat transfer fluid capable of working efficiently at extremely low temperatures, such as for example carbon dioxide. Optionally, only the last refrigeration system, operating at the highest temperature, discharges heat to the atmosphere or to cooling water. The evaporation temperature of each subsequent refrigeration system can be chosen such, that the preceding refrigeration system performs efficiently and can be built up from simple, standard components.

According to an aspect, the carbon dioxide will condense at a temperature determined by the second heat transfer fluid, which is according to the invention kept at a sufficiently low temperature to guarantee sub-critical condensation of the first heat transfer fluid, carbon dioxide, avoiding a relatively complex transcritical process of the carbon dioxide.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

For example, an odorous volatile compound, like Mercaptan, might be added to the first refrigerant, in the process area, in order to establish an early detection of a leakage or spill of the refrigerant in the process area, where the dry condensing system is located, at a low concentration well before the first refrigerant might become harmful for humans.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for deodorizing an edible oil or fat provided in a deodorizer, comprising:

in order:

stripping substances from the edible oil or fat with a stripping medium at a temperature of 160 degrees C. or more at a pressure of less than 5 mbar via transporting at least the stripping medium through the deodorizer and a scrubber to produce a deodorized and scrubbed stripping medium having a first pressure and then directly supplying the deodorized and scrubbed stripping medium at the first pressure as input to a holder of a multi-stage dry condensing system for processing in a multi-step process including:

in a first step where the deodorized and scrubbed stripping medium is received by the holder at the first pressure, reducing a volume of the deodorized and scrubbed stripping medium by desubliming or condensing by cooling the deodorized and scrubbed stripping medium using a first heat transfer fluid loop at a first temperature, and increasing pressure of said desublimed or condensed stripping medium to a first intermediate pressure to produce a first pressurized product that is supplied via a first pipe to a second heat transfer fluid loop;

in a second step, reducing the volume of the first pressurized product by desubliming or condensing by cooling the first pressurized product using the second heat transfer fluid loop at a second temperature, and increasing the first intermediate pressure of the first pressurized product to a second intermediate pressure to produce a second pressurized product that is supplied via a second pipe to a third heat transfer fluid loop;

in a third step, reducing the volume of the second pressurized product by desubliming or condensing by cooling the second pressurized product using the third heat transfer fluid loop at a third temperature, and increasing the second intermediate pressure to atmospheric pressure to produce a discharged product.

2. The method of claim 1, wherein the first heat transfer fluid loop is separate from the second heat transfer fluid loop.

3. The method of claim 1, wherein each subsequent heat transfer fluid loop takes up the heat from the preceding heat transfer fluid loop.

4. The method of claim 1, wherein the first heat transfer fluid loop includes a different heat transfer fluid from the second heat transfer fluid loop, and/or the second heat transfer fluid loop includes a different heat transfer fluid from the third heat transfer fluid loop.

5. The method of claim 1, wherein the first heat transfer fluid loop includes $CO_2$.

6. The method of claim 5, wherein the $CO_2$ in the first heat transfer fluid loop is always maintained subcritical.

7. The method of claim 1, wherein a portion of the stripping medium bypasses the first step.

8. The method of claim 1, wherein an odorous compound is added to the first heat transfer fluid loop.

9. The method of claim 3, wherein heat from the first heat transfer fluid loop is transported to the second heat transfer fluid loop via an intermediate circuit.

10. A deodorizing system for deodorizing an edible oil or fat provided in a deodorizer, comprising:

the deodorizer arranged with a scrubber for stripping substances from the edible oil or fat with a stripping medium at a temperature of 160 degrees C. or more at a pressure of less than 5 mbar to produce a deodorized and scrubbed stripping medium having a first pressure;

a dry condensing system receiving the deodorized and scrubbed stripping medium from the deodorizer at the first pressure as input to a holder associated therewith, the dry condensing system including:

a first volume reduction unit including a first heat transfer fluid loop having the holder for directly receiving the deodorized and scrubbed stripping medium at the first pressure from the deodorizer via a connection pipe and for reducing volume of the deodorized and scrubbed stripping medium via desubliming or condensing at a first temperature, and a first pressurizing system arranged for increasing pressure of said desublimed or condensed stripping medium to a first intermediate pressure to produce a first pressurized product that is directly supplied via a first pipe to a second heat transfer fluid loop;

a second volume reduction unit including the second heat transfer fluid loop for reducing volume of the first pressurized product via desubliming or condensing at a second temperature, and a second pressurizing system arranged for increasing the first intermediate pressure of the first pressurized product to a second intermediate pressure to produce a second pressurized product that is directly supplied via a second pipe to a third heat transfer fluid loop; and a third volume reduction unit including the third heat transfer fluid loop for reducing volume of the second pressurized product via desubliming or condensing at a third temperature, and a third pressurizing system arranged for increasing the second intermediate pressure to atmospheric pressure to produce a discharged product.

11. The deodorizing system of claim 10, wherein the first heat transfer fluid loop is separate from the second heat transfer fluid loop.

12. The deodorizing system of claim 10, wherein each subsequent heat transfer fluid loop is arranged to take up the heat from the preceding heat transfer fluid loop.

13. The deodorizing system of claim 10, wherein the first heat transfer fluid loop includes a different heat transfer fluid than the second heat transfer fluid loop, and/or the second heat transfer fluid loop includes a different heat transfer fluid than the third heat transfer fluid loop.

14. The deodorizing system of claim 10, wherein the first heat transfer fluid loop includes $CO_2$.

15. The deodorizing system of claim 14, wherein the $CO_2$ in the first heat transfer fluid loop is always maintained subcritical.

16. The deodorizing system of claim 10, including a bypass for allowing a portion of the stripping medium to bypass the first volume reduction unit.

17. The deodorizing system of claim 10, wherein an odorous compound is added to the first heat transfer fluid loop.

18. The deodorizing system of claim 12, wherein heat from the first heat transfer fluid loop is transported to the second heat transfer fluid loop via an intermediate circuit.

* * * * *